(12) United States Patent
Kohara et al.

(10) Patent No.: US 8,830,263 B2
(45) Date of Patent: Sep. 9, 2014

(54) MEDICAL IMAGE DISPLAY DEVICE AND MEDICAL IMAGE DISPLAY METHOD

(75) Inventors: Ryota Kohara, Tokyo (JP); Hiroto Kokubun, Tokyo (JP); Nobutaka Abe, Tokyo (JP); Takashi Shirahata, Tokyo (JP); Tetsuo Nakazawa, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 186 days.

(21) Appl. No.: 13/383,759

(22) PCT Filed: Jul. 21, 2010

(86) PCT No.: PCT/JP2010/062198
§ 371 (c)(1),
(2), (4) Date: Jan. 12, 2012

(87) PCT Pub. No.: WO2011/010644
PCT Pub. Date: Jan. 27, 2011

(65) Prior Publication Data
US 2012/0127200 A1    May 24, 2012

(30) Foreign Application Priority Data
Jul. 24, 2009   (JP) .................................. 2009-172602

(51) Int. Cl.
*G09G 5/00*   (2006.01)
*G06T 19/00*  (2011.01)
*G06T 15/08*  (2011.01)

(52) U.S. Cl.
CPC ............. *G06T 19/00* (2013.01); *G06T 2210/41* (2013.01); *G06T 19/006* (2013.01); *G06T 15/08* (2013.01)
USPC .......................................... 345/629; 382/128

(58) Field of Classification Search
USPC .......... 345/629, 619, 421, 427; 382/128, 132, 382/276
See application file for complete search history.

(56) References Cited

U.S. PATENT DOCUMENTS

| | | | |
|---|---|---|---|
| 5,630,034 A * | 5/1997 | Oikawa et al. | ................ 345/424 |
| 2004/0183828 A1 | 9/2004 | Nichogi et al. | |
| 2005/0152587 A1* | 7/2005 | Sirohey et al. | ................ 382/128 |

(Continued)

FOREIGN PATENT DOCUMENTS

| | | |
|---|---|---|
| JP | 2004-219731 | 8/2004 |
| JP | 2006-18606 | 1/2006 |

(Continued)

OTHER PUBLICATIONS

International Search Report in PCT/JP2010/062198.

*Primary Examiner* — Xiao Wu
*Assistant Examiner* — Steven Elbinger
(74) *Attorney, Agent, or Firm* — Cooper & Dunham LLP

(57) ABSTRACT

The medical image display device is provided with a medical image reading unit configured to read a medical image obtained by a medical image diagnostic apparatus, a projected image creating unit configured to project the medical image onto a projection plane to created the projected image, and a projected image display unit configured to display the projected image, wherein the projected image creating unit has a virtual liquid generating unit configured to generate virtual liquid, the light transmittance of which is not zero and a virtual liquid adding unit configured to add the virtual liquid to the surface of an organ within the medical image, and creates a projected image of the medical image to which the virtual liquid has been added.

12 Claims, 16 Drawing Sheets

(56) References Cited

U.S. PATENT DOCUMENTS

| | | | |
|---|---|---|---|
| 2006/0002626 A1* | 1/2006 | Matsumoto | 382/276 |
| 2006/0274065 A1 | 12/2006 | Buyanovskiy | |
| 2007/0040833 A1 | 2/2007 | Buyanovski | |
| 2007/0244393 A1 | 10/2007 | Oshiki et al. | |
| 2007/0262989 A1 | 11/2007 | Buyanovskiy | |
| 2008/0273784 A1* | 11/2008 | Pfister | 382/131 |
| 2009/0067027 A1* | 3/2009 | Hennigan | 359/228 |

FOREIGN PATENT DOCUMENTS

| | | |
|---|---|---|
| JP | 2007-503060 | 2/2007 |
| JP | 2008-100107 | 5/2008 |
| WO | WO2005/117712 A1 | 12/2005 |

* cited by examiner

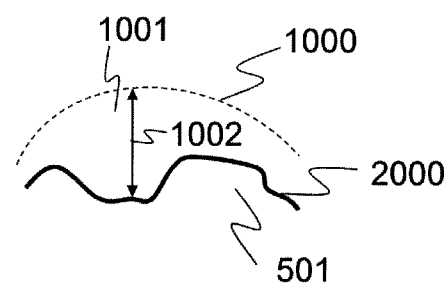
F I G . 5 C

F I G . 5 D
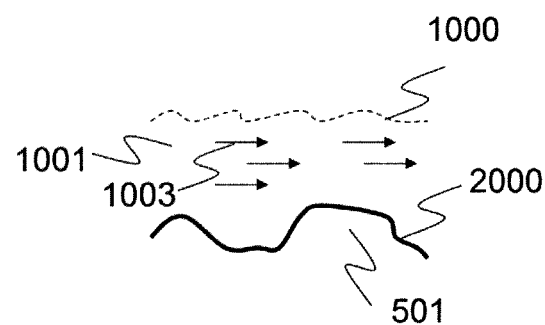

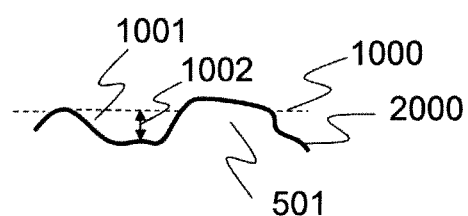
F I G . 5 F

MEDICAL IMAGE DISPLAY DEVICE AND MEDICAL IMAGE DISPLAY METHOD

FIELD OF THE INVENTION

The present invention relates to a medical image display device and medical image display method that display a medical image obtained from a medical image diagnostic apparatus including an X-ray CT apparatus, MRI apparatus and ultrasonic diagnostic apparatus, and a technique that displays a projected image having depth information while maintaining the pixel value acquired upon scanning.

DESCRIPTION OF RELATED ART

One of the 3-dimensional image display methods that display a medical image obtained from a medical image diagnostic apparatus including an X-ray CT apparatus, MRI apparatus and ultrasonic diagnostic apparatus is the VE (Virtual Endoscopy) display method. The virtual endoscopy display method creates and displays an image showing the inside of a hollow organ in an object to be examined as if it is being diagnosed using an endoscope from the image data acquired by a medical image diagnostic apparatus, and the image created by the present method is referred to as a virtual endoscopic image. A virtual endoscopic image enables diagnosis from the direction which can not be performed by actual examination, since it is a virtual image. On the other hand, since virtual endoscopic images are different from real endoscopic images in that, for example colors inside of a lumen cannot be displayed, operators who are used to real endoscopic images have a problem in reading virtual ones.

In pursuance of solving such a problem, Patent Document 1 discloses the method that displays virtual endoscopic images by adding contrast thereto.

PRIOR ART DOCUMENT

Patent Document 1: JP-A-2000-148983

However, Patent Document 1 does not consider adding texture to virtual endoscopic images. The texture here means freshness which is unique to biological objects and glossiness associated with freshness. The freshness and the associated glossiness are attributable to moisture included in mucosa which exists on the surface of an organ or mucus secreted by mucosa. For operators who are used to observe actual endoscopic images, virtual endoscopic images without texture are difficult to read. Also, there is a difference in texture between the organ that a surgeon directly observes and the images obtained by a medical image diagnostic apparatus.

Given these factors, the objective of the present invention is to provide a medical image display device and medical image display method capable of creating and displaying the medical image having texture which is approximated to actual endoscope images or images obtained by directly viewing an organ.

BRIEF SUMMARY OF THE INVENTION

In order to achieve the above-described objective, the present invention creates a projected image with texture wherein virtual liquid equivalent to a mucosa exists on the surface of organs or moisture included in mucus secreted by a mucosa is added to the projected image created using a medical image.

In concrete terms, the medical image display device and medical image display method comprising:

a medical image reading unit configured to read a medical image obtained by a medical image diagnostic apparatus;

a projected image creating unit configured to create a projected image by projecting the medical image on a projected plane; and a projected image display unit configured to display the projected image, wherein:

the projected image creating unit has a virtual liquid generating unit configured to generate virtual liquid of which the light transmission is not zero and a virtual liquid adding unit configured to add the virtual liquid on the projected image; and the projected image display unit displays the projected image to which the virtual liquid is added.

In accordance with the present invention, it is possible to provide the medical image display device and medical image display method capable of creating and displaying the medical image having texture approximated to actual endoscope images or images obtained by directly viewing an organ.

BRIEF DESCRIPTION OF THE DIAGRAMS

FIG. 5C is a view exemplifying a liquid surface profile of virtual liquid.

FIG. 5D is a view exemplifying a liquid surface profile of virtual liquid.

FIG. 5F is a view exemplifying a liquid surface profile of virtual liquid.

DETAILED DESCRIPTION OF THE INVENTION

Figure 1:
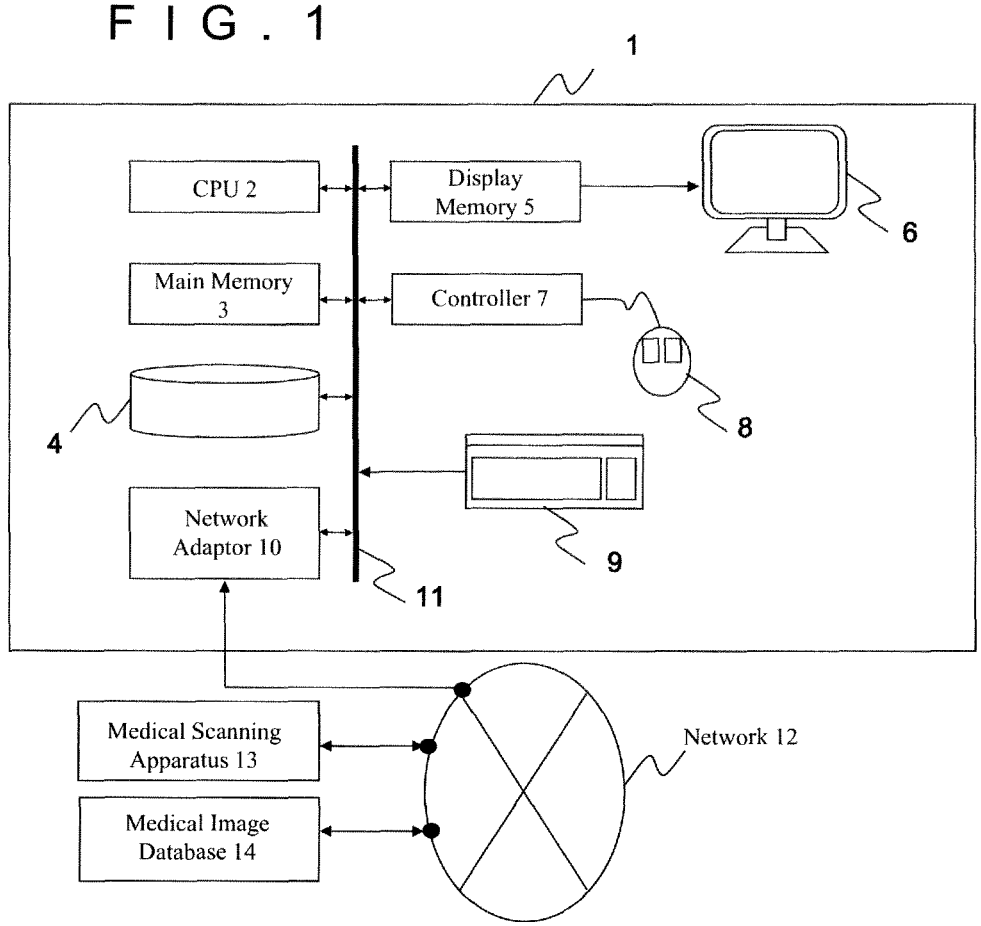
FIG. 1 is a view showing hardware configuration of the medical image display device related to the present invention.

Preferable embodiments of the medical image display device related to the present invention will be described below referring to the attached diagrams. In the following description and diagrams, the same function parts are represented by the same reference numerals, and the duplicative description thereof is omitted.

FIG. 1 is a view showing hardware configuration of a medical image display device 1. The medical image display device 1 is configured by a CPU (Central Processing Unit) 2, a main memory 3, a storage device 4, a display memory 5, a display device 6, a controller 7 connected to a mouse 8, a keyboard 9 and a network adapter 10 while being capable of transmitting/receiving signals by a system bus 11. The medical image display device 1 is connected to a medical image scanning apparatus 13 or a medical image database 14 via a network 12 while being capable of transmitting/receiving signals. Here, "being capable of transmitting/receiving signals" means the condition that signals can be transmitted and received to one another or from one to the other electrically and optically, both wired and wireless.

The CPU 2 controls operation of the respective components. The CPU 2 loads and executes the program to be stored in the storage device 4 or necessary data for executing the program in the main memory 3. The storage device 4 stores the medical image information scanned by the medical image scanning apparatus 13, and is concretely a hard disk, etc.

Also, the storage device 4 may be a device for transferring data to a portable storage device such as a flexible disk, optical (magnetic) disk, ZIP memory or USB memory. Medical image information is acquired from the medical image scanning apparatus 13 or the medical image database 14 via the network 12 such as a LAN (Local Area Network). Also, the programs to be executed by the CPU 2 or necessary data for executing the programs are stored in the storage device 4. The main memory 3 stores the programs to be executed by the CPU 2 or intermediate steps of calculation process.

The display memory 5 temporarily stores the display data to be displayed on the display device 6 such as a liquid crystal display or a CRT (Cathode Ray Tube). The mouse 8 and the keyboard 9 are operation devices for the operators to execute operation guidance with respect to the medical image display device 1. The mouse 8 may be another pointing device such as a track pad or trackball. The controller 7 detects the condition of the mouse 8, acquires the position of a mouse pointer on the display device 6 and outputs the acquired positional information, etc. to the CPU 2. The network adapter 10 connects the medical image display device 1 to the network 12 including devices such as a LAN, a telephone line and the internet.

The medical image scanning apparatus 13 obtains medical image information such as a tomographic image of an object The medical image scanning apparatus 13 is, for example an MRI apparatus, X-ray CT apparatus, ultrasonic diagnostic apparatus, scintillation camera device, PET device and SEPCT device. The medical image database 14 is a database system that stores medical image information scanned by the medical image scanning apparatus 13.

The medical images having texture which is more approximated to actual endoscopic images or images obtained by directly viewing an organ are created and displayed on the display device 6, by the CPU 2 executing the processing flow to be described below.

Embodiment 1

Figure 2:
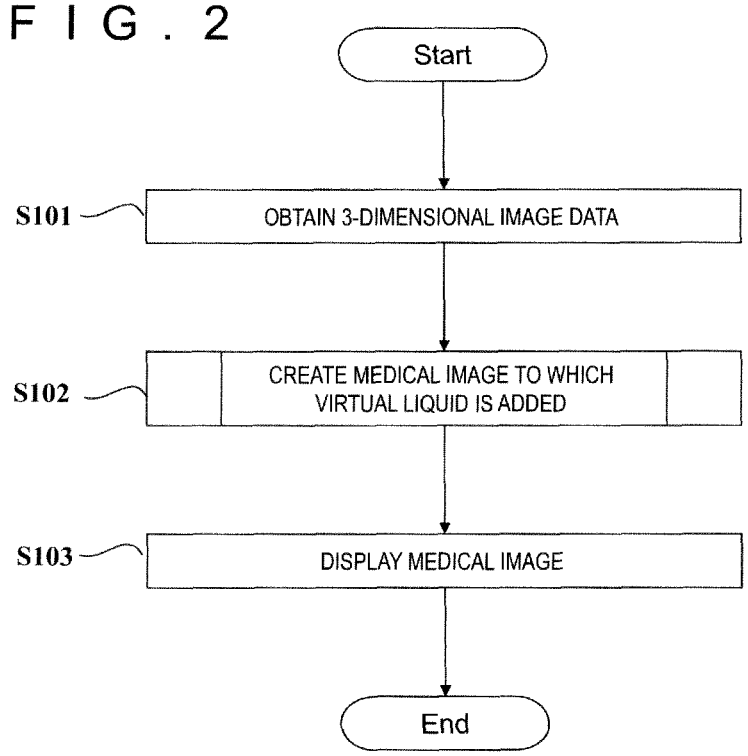
FIG. 2 is a view showing the processing flow of a first embodiment related to the present invention.

FIG. 2 shows the processing flow of the first embodiment related to the present invention. The respective steps of FIG. 2 will be described below in detail.

(Step S101)

The CPU 2 acquires 3-dimensional image data of the object which is selected via the mouse 8 or the keyboard 9 by an operator from the medical image scanning apparatus 13 or the medical image database 14 via the network 12. The 3-dimensional image data here is configured by several to hundreds of pieces of tomographic images obtained by scanning the object that are consecutively arranged, for example in the direction vertical to the cross-sectional plane.

(Step S102)

Figure 3:
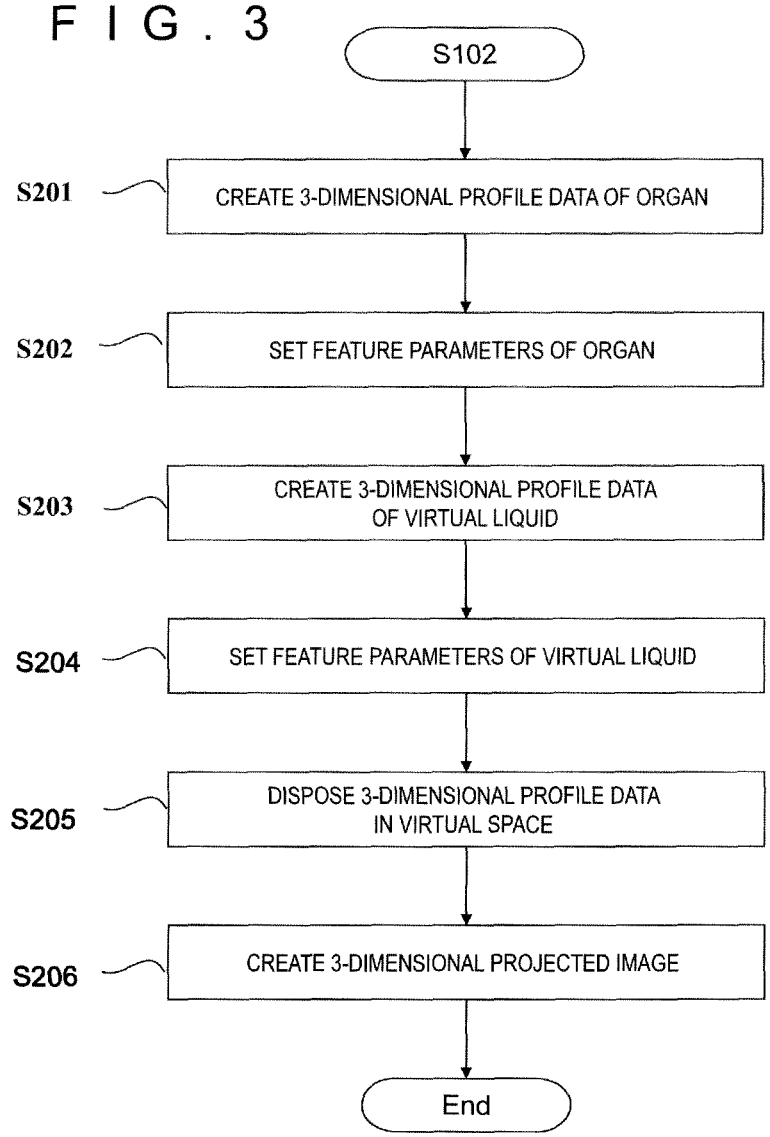
FIG. 3 is a view showing a first example of the processing flow in S102.

The CPU 2 creates a medical image to which virtual liquid is added using the 3-dimensional image data acquired in S101. The virtual liquid equivalent to the moisture included in the mucosa exists on the surface of an organ or the mucus secreted by the mucosa is added to the medical image created in the present step, and for example, the virtual endoscopic image having texture which is more approximated to the actual endoscopic image is created. FIG. 3 shows the first example of the processing flow for creating the medical image to which virtual liquid is added, and the respective steps thereof will be described below referring to FIG. 4 which is the supplementary explanation diagram.

(Step S201)

Figure 4:
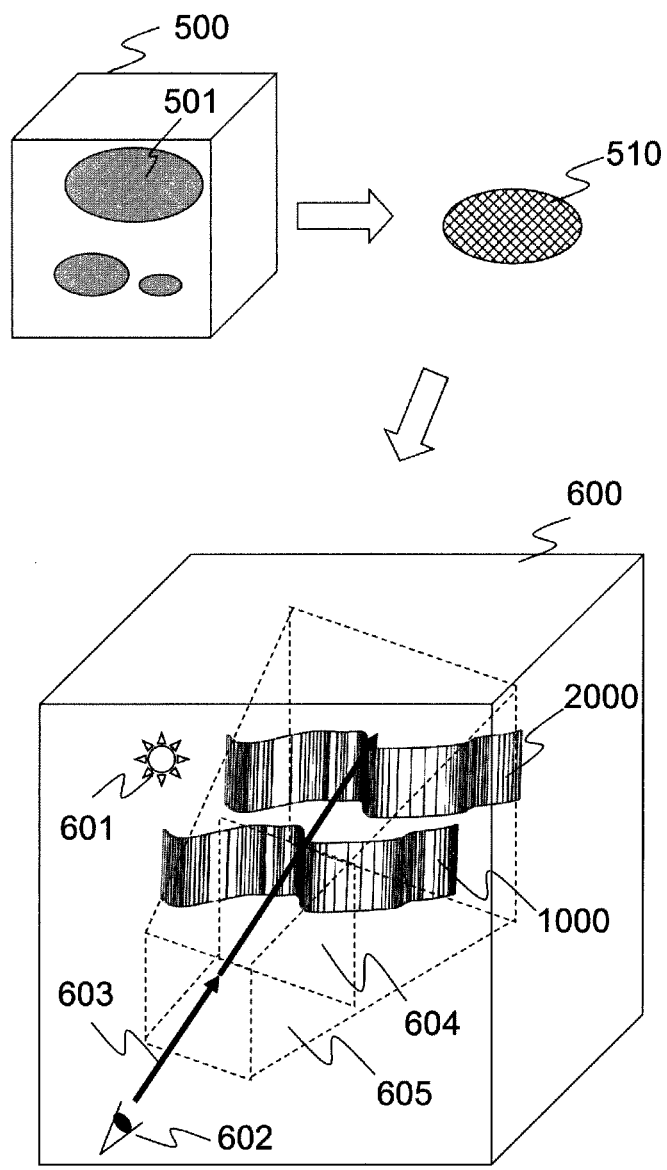
FIG. 4 is a supplementary explanation diagram for the first example of the processing flow in S102.

The CPU 2 creates the 3-dimensional profile data of an organ using the 3-dimensional image data acquired in S101. As shown in FIG. 4, an organ 501 which is the target for diagnosis is included in 3-dimensional image data 500. Given this factor, the CPU 2 extracts the organ 501 by executing region determination within the 3-dimensional image data 500 using the threshold value corresponding to the organ 501, and creates profile data 510 of the organ 501. The CPU 2 may also create the profile data 510 by extracting the organ 501 by determining the region profile based on the anatomic feature in the profile of the organ 501. The profile data 510 of the organ 501 is stored in the main memory 3 or the storage device 4 as the 3-dimensional profile data. The 3-dimensional profile data may also be the 3-dimensional surface profile data by polygonal representation, etc.

(Step S202)

The CPU 2 sets feature parameters with respect to the organ 501 which is extracted in S201. Feature parameters of an organ include the reflectance or refraction index, etc. that present optical features of the organ. Optical features of the organ set in the present step may be the physical property of the target organ, or the physical property of an arbitrary material which is similar to the target organ. As for the color of an organ which is one of the feature parameters, anatomic colors of the target organ may be reflected or arbitrary colors may be set.

(Step S203)

The CPU 2 creates 3-dimensional profile data of virtual liquid. 3-dimensional profile data of virtual liquid is created to cover the surface of the organ 501 with an arbitrary thickness by setting the surface of the profile data 510 of the organ created in S201 as the reference surface. Here, the surface of the profile data 510 is the boundary surface of the profile data 510 of the organ, which is the boundary surface on the side which is closer to the view-point position to be set upon creating the projected image to be described later.

FIG. 5 show examples of the liquid profile of a virtual liquid 1001. FIG. 5A is an example of the case that the profile of a surface 2000 of the organ 501 and a liquid surface 1000 of the virtual liquid 1001 are assumed to be the same, and a thickness 1002 of the virtual liquid 1001 is constant regardless of its location. In the present example, since the liquid surface 1000 of the virtual liquid 1001 can be created by merely moving the profile data of the surface 2000 of the organ 501 in parallel, workload of the CPU 2 can be reduced upon creating the profile data of the virtual liquid 1001.

Figure 5A:
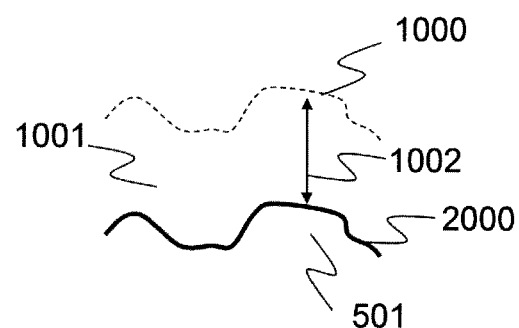
FIG. 5A is a view exemplifying a liquid surface profile of virtual liquid.
Figure 5B:
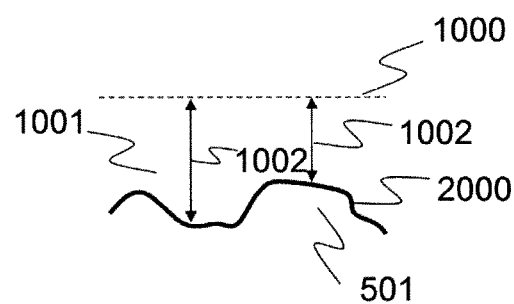
FIG. 5B is a view exemplifying a liquid surface profile of virtual liquid.

FIG. 5B is an example of the case that the profile of the liquid surface 1000 of the virtual liquid 1001 is set as a constant liquid surface regardless of the profile of the surface 2000 of the organ 501. In the present example, since the liquid surface 1000 of the virtual liquid 1001 has a simple profile, workload of the CPU 2 can be reduced upon creating the profile data of the virtual liquid 1001.

FIG. 5C is an example of the case that the profile of the liquid surface 1000 of the virtual liquid 1001 is set as having a certain curvature. The curvature of the liquid surface 1001 may be determined by the physical property such as viscosity of virtual liquid, or according to the profile of the surface 2000 of the organ 501.

Figure 5E:
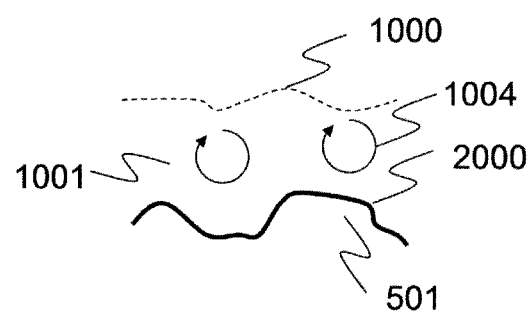
FIG. 5E is a view exemplifying a liquid surface profile of virtual liquid.

FIG. 5D and FIG. 5E are examples of the cases that the profile of the liquid surface 1000 of the virtual liquid 1001 is obtained by assuming that current 1003 or vortex flow 1004 is generated in the virtual liquid 1001. Accordingly, the profile of the liquid surface of the virtual liquid 1001 may be locally changed by adding the influence of the current 1003 or the vortex flow 1004. The current 1003 or the vortex flow 1004 may also be determined based on the profile of the surface 2000 or temperature, and the surface tension or temperature of the mucus of an organ.

FIG. 5F is an example of the case that the profile of the liquid surface 1000 of the virtual liquid 1001 is obtained by assuming that the virtual liquid 1001 covers not all but a part of the surface 2000 of the organ 501. This case assumes that the amount of mucus is not enough to cover the entire surface of the organ, and the mucus exists only on the concave portion of the organ 501.

Figure 5G:
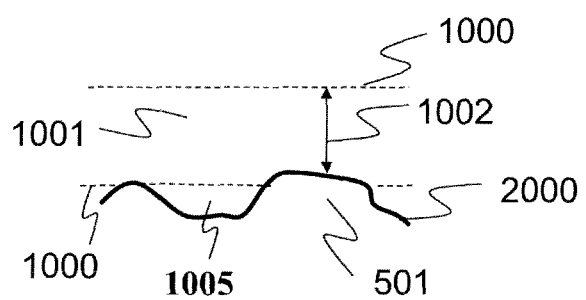
FIG. 5G is a view exemplifying a liquid surface profile of virtual liquid.

FIG. 5G is an example of the case that the profile of the liquid surface 1000 of the virtual liquid 1001 is obtained by assuming that the virtual liquid 1001 is not attached firmly on the surface 2000 of the organ 501 and there is partially a gap 1005 between the organ 501 and the virtual liquid 1001. This case assumes that the mucus having a great surface tension cannot penetrate into the concave portion of the organ 501.

The liquid surface profiles of virtual liquid are not limited to those shown in FIG. 5, and they can be arbitrarily combined. For example, bubbles generated on the surface of the organ 501 can be simulated by combining FIG. 5C and FIG. 5G.

(Step S204)

The CPU 2 sets feature parameters with respect to the virtual liquid created in S203. Feature parameters of virtual liquid include the reflectance, refraction index, or absorption factor, etc. that present optical features of the organ. Optical features of virtual liquid set in the present step may be the physical property of mucus, or the physical property of an arbitrary material which is similar to mucus, for example the physical property of water. The color of an organ which is one of the feature parameters may be colorless, anatomic colors of the target organ may be reflected, or an arbitrary color may be set. While the above-described feature parameters physically depend on wavelength of light, the parameters can be made to depend or not to depend on wavelength of light in S102 upon creating medical images. In this regard, however the light's transmission factor of virtual liquid must not be zero.

(Step S205)

The CPU 2 disposes a target organ and the virtual liquid created to cover the organ in a virtual space. The CPU 2 uses the 3-dimensional profile data of an organ created in S201 and the 3-dimensional profile data of the virtual liquid created in S203 upon disposing the organ and the virtual liquid in the virtual space. The organ data added with the virtual liquid data is created in the virtual space by the process of the present step.

(Step S206)

The CPU 2 creates a 3-dimensional projected image using the organ data added with the virtual liquid data created in the virtual space. The CPU 2 sets a light source, a view point, a line-of-sight direction and a projection plane upon creating the 3-dimensional projected image. FIG. 4 is a view showing an example of the surface 2000 of the organ and the liquid surface 1000 of the virtual liquid, a light source 601, a view point 602, a line-of-sight direction 603 and a projection plane 604 that are set in the virtual space 600.

For creating 3-dimensional projected images, a publicly known technique such as the ray tracing method considering direct light and indirect light (diffuse reflection light, specular reflection light, refracting light and environment light) from the light source 601 or the radiosity method that calculates the influence of indirect light in greater detail is used. When the influence of indirect light is considered, more realistic 3-dimensional projected image can be created by adding virtual liquid or optical feature of an organ.

Also, the 3-dimensional projected image can be created so as to match the image with the situation of an actual endoscopic imaging by positioning the light source 601 to the vicinity of the view point 602, or so as to match the image with an actual surgery situation by setting the light source 601 as the surface light source.

Since the 3-dimensional projected image of an organ added with virtual liquid can be created by the process of the present step, it is possible to obtain medical images having texture which are more approximated to actual endoscopic images or images obtained by directly viewing an organ.

(Step 103)

Figure 6:
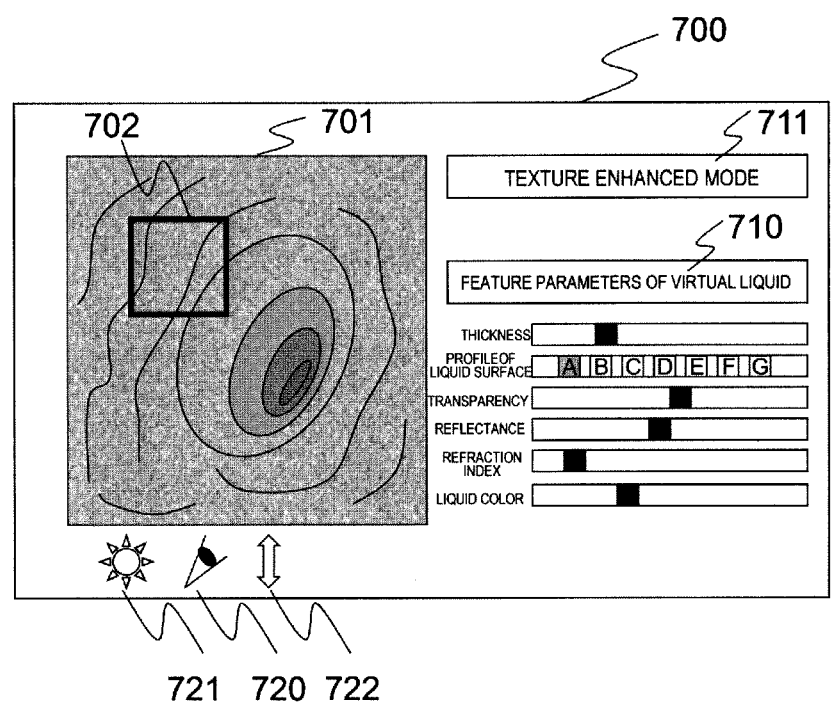
FIG. 6 is an example of GUI for processing the first embodiment of the present invention.

The CPU 2 displays the medical image created in S102 on the display device 6. On the display device 6, the interface for setting various parameters to be used upon creating the medical image may also be displayed along with a medical image. FIG. 6 is an example of a display screen to be displayed on the display device 6.

On the display screen 700 of FIG. 6, a medical image display region 701, an interface 711 for switching medical image creation mode, an interface 710 for setting virtual liquid feature, an interface 721 for setting a light source, an interface 720 for setting a view point and an interface 722 for setting a projection plane are provided.

The medical image display region 701 is a region on which the medical image created in S102 is displayed, and the operator can set a region of interest 702 by operating the mouse 8.

The interface 711 for switching medical image creation mode is the interface for switching whether or not to add virtual liquid on the medical image created in S102. On the interface 711 in FIG. 6, "texture enhancement mode" is selected which indicates that the medical image added with virtual liquid is to be created. Also, virtual liquid may also be added only to the region of interest 702 set by the operator via the mouse 8 so as to create the medical image to which texture is added partially.

The interface 710 for setting features of virtual liquid is the interface for setting feature parameters of the virtual liquid to be added to an organ. On the interface 710 in FIG. 6, thickness, liquid surface profile, transparency, reflectance, refraction index and liquid color are displayed as settable feature parameters. A desired liquid surface profile can be selected by selecting a button, and buttons A~G shown in FIG. 6 can be corresponded, for example to the liquid surface profiles shown in FIGS. 5A~G. The values of parameters except the liquid profile can be inputted by a slider. The effect which the respective feature parameters have on the medical image added with virtual liquid will be described below. In the following description, the medical images that are more approximated to actual endoscopic images or images obtained by directly viewing an organ are referred to as texture enhanced images, and hue, brightness, color saturation and object color, etc. will be used according as needed.

Thickness of virtual liquid has an effect on texture enhancement. Thicker virtual liquid has more effective texture enhancement while thinner virtual liquid has less effective texture enhancement, and having zero thickness results in a conventional medical image.

The liquid surface profile of virtual liquid has effect on the region where texture is enhanced. Examples of liquid profiles shown in FIG. 5 will be described below in concrete terms. In the case of FIG. 5A, texture of an organ surface on an image is enhanced evenly. In the case of FIG. 5B, texture of an organ surface on an image is enhanced according to the surface profile. In the case of FIG. 5C, texture of an organ surface on an image is enhanced according to the curvature of virtual liquid surface. Texture in the vicinity of the region's center is enhanced when the curvature is positive, and the vicinity of the region's boundary is texture-enhanced when the curvature is negative. In the case of FIG. 5D, texture of the organ's surface on an image is enhanced globally and locally in the directional wavefront pattern. In the case of FIG. 5E, texture of the organ surface on an image is globally enhanced, and further enhanced locally in vortex wavefront pattern. In the case of FIG. 5F, texture of the convex portion in the organ surface on an image is more enhanced. In the case of FIG. 5G, texture of the concave portion in the organ surface on an image is more enhanced. In addition, liquid profile of virtual liquid is not limited to the profiles shown in FIG. 5.

Transparency of virtual liquid has an effect on brightness and color saturation of organ surfaces. More transparent virtual liquid has higher brightness and color saturation on the surface of an organ while less transparent virtual liquid has lower brightness and color saturation.

Reflectance of virtual liquid has an effect on brightness and color saturation of organ surfaces. Virtual liquid having higher reflectance has higher brightness and lower color saturation on the surface of organ, since the virtual liquid on an image takes on the hue of illuminant color. For example, if illuminant color is white, virtual liquid takes on white color and thus the organ surface also takes on white color. When the reflection ratio of virtual liquid is lowered, brightness of the organ surface is also lowered and the color saturation thereof changes according to the object color of virtual liquid, since the organ surface takes on the hue of illuminant color of the organ surface and the virtual liquid in the image. For example, if the object color of the organ surface is red and the object color of virtual liquid has no color, the organ surface takes on red color.

Refraction index of virtual liquid has an effect on strain of organ surfaces. Virtual liquid having higher refraction index has greater strain on the surface of an organ while virtual liquid having lower refraction index has smaller strain.

Liquid color of virtual liquid changes the object color of virtual liquid on an image. Therefore, the organ surface on an image takes on the hue of virtual liquid, and the brightness of organ surface changes according to the hue of virtual liquid.

The interface 720 for setting a view point is for moving the position of the view point 602 in the virtual space 600. The medical image to be displayed on the medical image display region 701 may be updated each time the position of the view point 602 is moved.

The interface 721 for setting a light source is for moving the position of the light source 601 in the virtual space 600. The medical image to be displayed on the medical image display region 701 may be updated each time the position of the light source 601 is moved. Also, the position of the light source 601 may be moved to the vicinity of the view point 602 so as to match the positions with the condition of an actual endoscopic imaging. Further, the light source 601 may be set switchable from a point light source to a surface light source via operation of the interface 721.

The interface 722 for setting a projection plane is for moving the position of the projection plane 604 within the range of a projection space 605. The medical image to be displayed on the medical image display region 701 may be updated each time the position of the projection plane 604 is moved.

By executing the above-described processing flow, the medical images having texture which is more approximated to actual endoscopic images or the images obtained by directly viewing an organ can be created.

Embodiment 2

Figure 7:
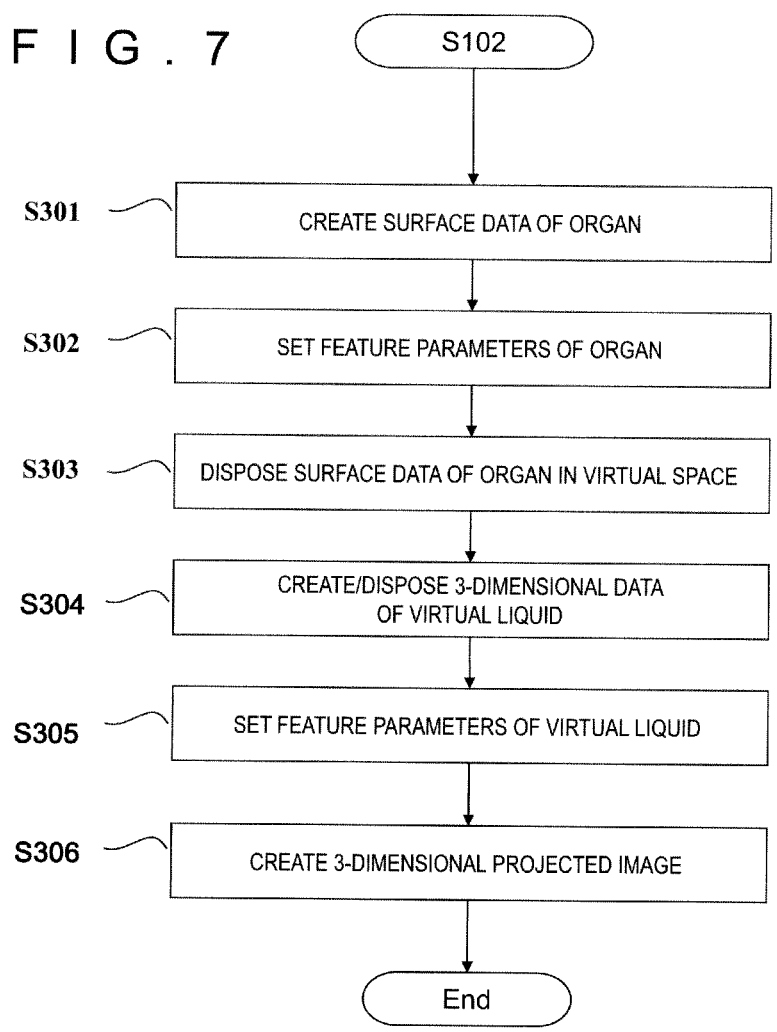
FIG. 7 is a view showing a second example of processing flow in S102.

The processing flow of a second embodiment is the same as the first embodiment except the creation process of medical images in S102, wherein an organ in a medical image treated as 3-dimensional profile data in the first embodiment as against surface data in the second embodiment. Given this factor, the description of the second embodiment except S102 will be omitted, and the respective steps of a second example of the processing flow for medical image creation shown in FIG. 7 will be described below referring to FIG. 8 which is the supplementary explanation diagram.

(Step S301)

Figure 8:
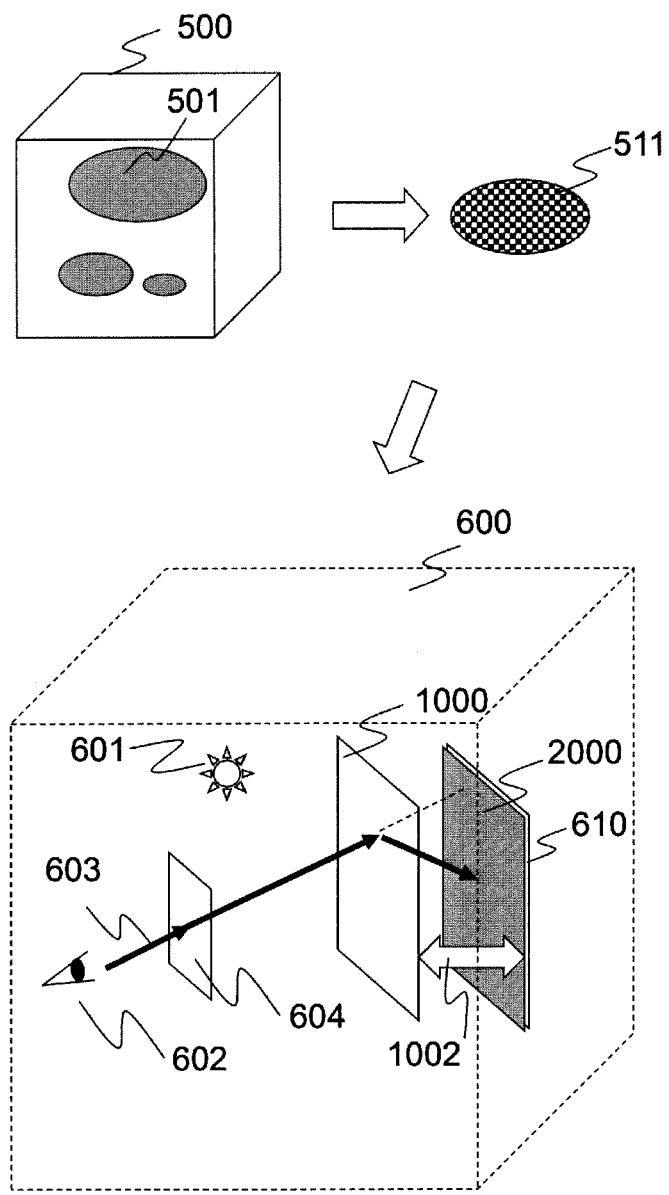
FIG. 8 is a supplementary explanation diagram of the second example of processing flow in S102.

The CPU 2 creates surface data of an organ using the 3-dimensional image data acquired in S101. As shown in FIG. 8, the organ 501 which is the target for diagnosis is included in the 3-dimensional image data 500. With that, the CPU 2 extracts the organ 501 by executing region determination in the 3-dimensional image data 500 using the threshold value corresponding to the organ 501, and creates surface data 511 of the organ 501. The CPU 2 may also extract the organ 501 by executing determination of region profile based on anatomic profile feature of the organ 501. The surface data 511 of the organ 501 is stored in the main memory 3 or the storage device 4 as the 2-dimensional image data, i.e. pixel data.

(Step S302)

The CPU 2 sets feature parameters with respect to the surface 2000 of the organ 501 which is extracted in S301. Feature parameters of an organ include the reflectance, refraction index, etc. which represent optical feature of an organ. Optical feature of an organ set in the present step may be the physical property of a target organ, or the physical property of an arbitrary material which is similar to a target organ. As for the color of an organ which is one of the feature parameters, anatomic colors of the target organ may be reflected or arbitrary colors may be set.

(Step S303)

The CPU 2 disposes the surface data 511 which is a target for diagnosis in the virtual space 600. In order to dispose the surface data 511 in the virtual space 600, for example the texture mapping method which is a publicly-known technique may be used to paste the surface data 511 with respect to a reference plane 610 that is arbitrarily set in the virtual space 600. Here, the reference plane 610 set in the virtual space 600 may be a planar surface, a curved surface or a concavo-convex surface.

(Step S304)

The CPU 2 creates 3-dimensional profile data of virtual liquid. The 3-dimensional profile data of virtual liquid has certain thickness, and is disposed on the side which is closer to a view-point position than the reference plane 610 set in S303. The liquid surface profile of virtual liquid may be set in the same manner as the first embodiment.

(Step S305)

The CPU 2 sets feature parameters with respect to the virtual liquid created in S304. Feature parameters of virtual liquid may be the same as in the first embodiment.

(Step S306)

The CPU 2 creates a 3-dimensional projected image using the surface data 511 of the organ 501 disposed in the virtual space 600 and the created virtual liquid. The CPU 2 sets a light source, a view point, a line-of-sight direction and a projection plane upon creating a 3-dimensional projected image. FIG. 8 shows an example of the surface 2000 of an organ and liquid surface 1000 of virtual liquid, the light source 601, the view point 602, the line-of-sight direction 603 and the projection plane 604 set in the virtual space 600. The creation method of a 3-dimensional projected image may be the same as in the first embodiment.

By executing the above-described processing flow, the medical images having texture which is more approximated to actual endoscopic images or images obtained by directly viewing an organ can be created.

The present embodiment is different from the first embodiment in that the profile of an organ is treated not as 3-dimensional profile data but as surface data, i.e. 2-dimensional image data, thus it is more suitable for high-speed processing since the smaller amount of data is used for calculation compared to the first embodiment.

Embodiment 3

Figure 9:
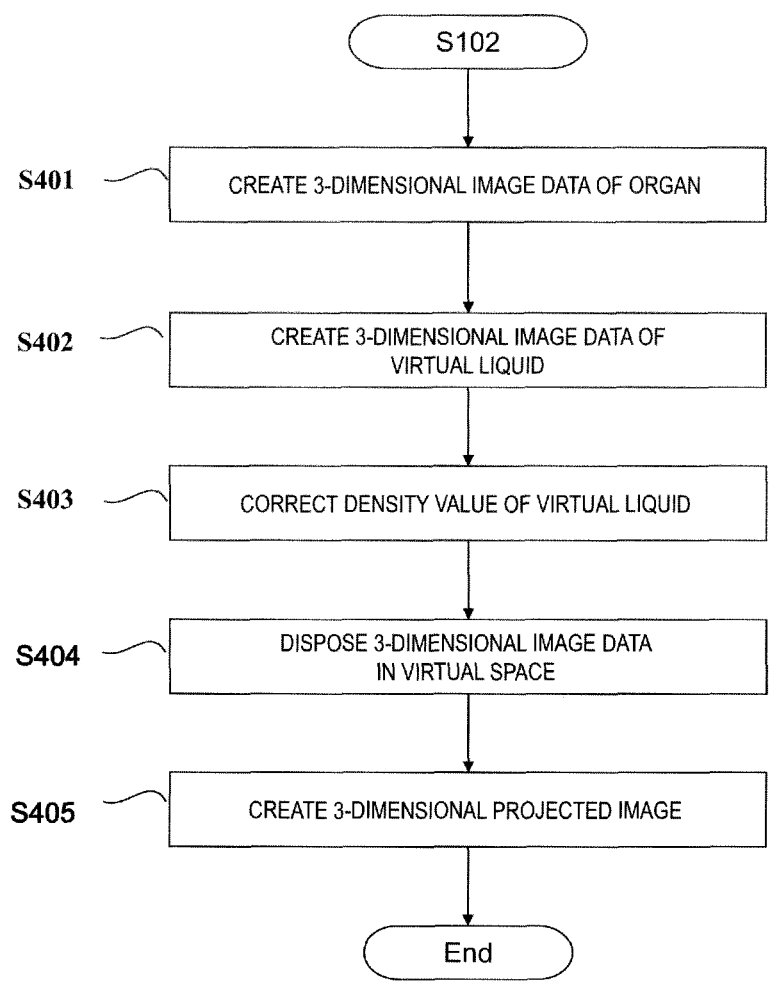
FIG. 9 is a view showing a third example of processing flow in S102.

The processing flow of a third embodiment is the same as the first and second embodiments except the creation process of medical images in S102, wherein the organ in a medical image is treated as 3-dimensional image data in the third embodiment as against 3-dimensional profile data in the first embodiment and as surface data in the second embodiment. Given this factor, the description of the third embodiment except S102 will be omitted, and the respective steps of a third example of the processing flow for medical image creation shown in FIG. 9 will be described below referring to FIG. 10 which is the supplementary explanation diagram.

(Step S401)

Figure 10:
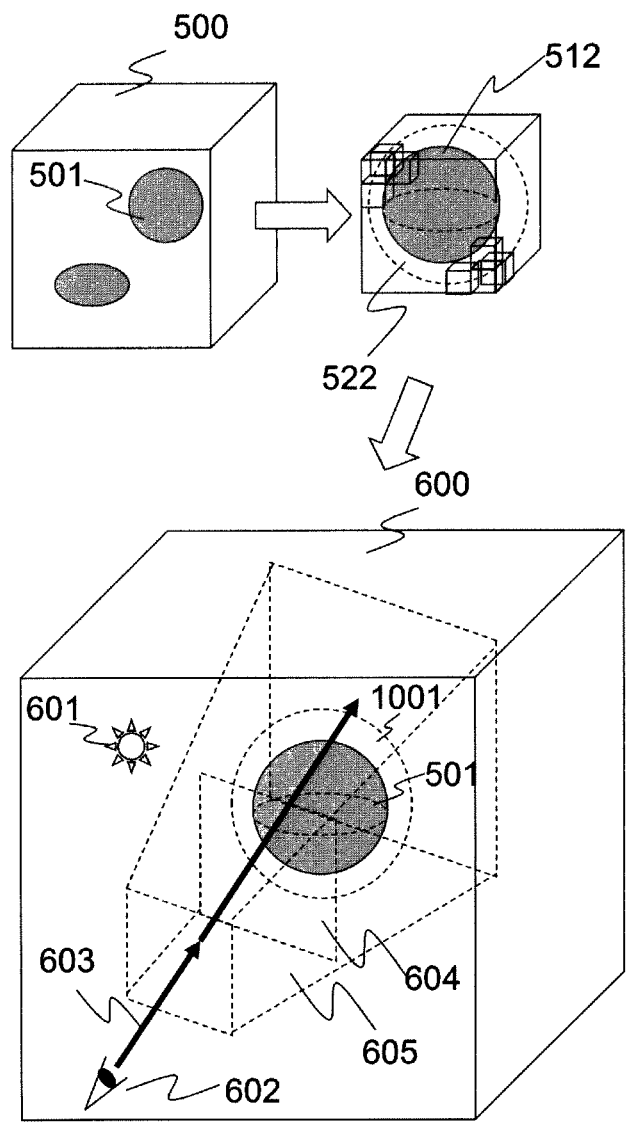
FIG. 10 is a supplementary explanation diagram of a third example of processing flow in S102.

The CPU 2 creates 3-dimensional image data of an organ using the 3-dimensional image data acquired in S101. As shown in FIG. 10, the organ 501 which is the target for diagnosis is included in the 3-dimensional image data 500. With that, the CPU 2 extracts the organ 501 by executing region determination in the 3-dimensional image data 500 using the threshold value corresponding to the organ 501, and creates a 3-dimensional image data 512 of the organ 501. The CPU 2 may also extract the organ 501 by executing determination of region profile based on the anatomic profile feature of the organ 501. The 3-dimensional image data 512 of the organ 501, i.e. voxel data is stored in the main memory 3 or the storage device 4.

(Step S402)

The CPU 2 creates the 3-dimensional image data of virtual liquid. 3-dimensional image data 522 of virtual liquid is the profile of which the profile of the organ 501 is enlarged according to the thickness of the virtual liquid 1001 using the barycenter of the organ 501 extracted in S401 as a reference point, and is created transparent. The created profile of the virtual liquid 1001 may also be modified, for example based on the liquid surface profile being set using the interface 710 for setting features of virtual liquid shown in FIG. 6.

(Step S403)

The CPU 2 modifies the density value of the 3-dimensional image data of virtual liquid. For example, the transparency, the reflectance, the refraction index, liquid color, etc. being set by using the interface 710 for setting features of the virtual liquid 1001 shown in FIG. 6 may also be used for modifying the density value. For example, the density value of the entire voxels of the virtual liquid 1001 may also be modified according to the set transparency or liquid color. Also, the density value of the voxels of a virtual liquid surface may be modified according to the degree of reflectance, or the density value of the voxels of virtual liquid attached to an organ may be modified according to the degree of refraction index.

(Step S404)

The CPU 2 disposes the diagnostic target organ and the virtual liquid added thereto in a virtual space. The CPU 2 uses the 3-dimensional image data 512 created in S401 and the 3-dimensional image data 522 of the virtual liquid created in S402 and modified in S403 upon disposing the organ 501 and the virtual liquid 1001 in the virtual space 600. By the processing of the present step, the organ data added with virtual liquid is created in the virtual space 600.

(Step 405)

The CPU 2 creates a 3-dimensional projected image using organ data added with the virtual liquid data created in the virtual space. The CPU 2 sets a light source, a view point and a projection plane upon creating the 3-dimensional projected image. FIG. 10 is an example of the organ 501, the virtual liquid 1001, the light source 601, the view point 602, the line-of-sight direction 603 and the projection plane 604 disposed and set in the virtual space 600.

For creation of 3-dimensional projected images, the volume rendering method which is a publicly known technique is used with respect to the organ data to which the virtual liquid data created in a virtual space is added. Optical features such as the transparency, the reflectance, the refraction index and liquid color of virtual liquid may be used for modification of virtual liquid's density value as described in S402, or may be reflected on the opacity upon creation of 3-dimensional projected image by the volume rendering method.

In accordance with the processing of the present step, the 3-dimensional projected image of an organ to which virtual liquid is added can be created, whereby medical images having texture which is more approximated to actual endoscopic images or images obtained by directly viewing an organ can be obtained.

By executing the above-described processing flow, it is possible to create medical images having texture which is more approximated to actual endoscopic images or images obtained by directly viewing an organ.

The first to the third embodiments have been described above, and these embodiments may also be properly combined to configure a medical image display device.

The difference of the images created by the present invention from the images created by the surface rendering method which is a publicly known technique will be described below. While it is possible to change glossiness of the surface of an organ in images created by the surface rendering method, it is difficult to partially change the glossiness since glossiness depends on the surface asperity of organs. On the other hand, in the images created by the present invention, it is possible to partially change glossiness of the surface of an organ by adding virtual liquid thereto. In actual endoscopic images or images obtained by directly viewing an organ, the mucus secreted by mucosa which exists on the surface of organs is unevenly distributed, which causes glossiness of the organ surface to be partially changed or partial deformation to be generated on the surface asperity of organs. In accordance with the present invention, it is possible to create and display the image in which the glossiness is partially changed or partial deformation is generated on the surface asperity by properly adding virtual liquid.

DESCRIPTION OF THE REFERENCE NUMERALS

1: medical image display device
2: CPU
3: main memory
4: storage device
5: display memory
6: display device
7: controller
8: mouse
9: keyboard
10: network adapter
11: system bus
12: network
13: medical image scanning apparatus
14: medical image database
500: 3-dimensional image data
501: diagnostic target organ
510: profile data of the organ 501
511: surface data of the organ 501
512: 3-dimensional image data of the organ 501
522: 3-dimensional image data of virtual liquid
600: virtual space
601: light source
602: view point
603: line-of-sight direction
604: projection plane
605: projection space
610: reference plane
700: display screen
701: medical image display region
702: region of interest
710: interface for setting features of virtual liquid
711: interface for switching image creation mode
720: interface for setting a view point
721: interface for setting a light source
722: interface for setting a projection plane
1000: liquid surface of virtual liquid
1001: virtual liquid
1002: thickness of virtual liquid
1003: current
1004: vortex flow
2000: surface of an organ

The invention claimed is:

1. A medical image display device comprising:
a medical image reading unit configured to read a medical image obtained by a medical image diagnostic apparatus;
a projected image creating unit configured to create a projected image by projecting the medical image on a projection plane; and
a display unit configured to display the projected image, wherein the projected image creating unit comprises:
a virtual liquid generating unit configured to generate virtual liquid which is created by simulating moisture on a surface of an organ; and
a virtual liquid adding unit configured to add the virtual liquid on the surface of the organ in the medical image, so as to create the projected image of the medical image to which the virtual liquid is added,
wherein the virtual liquid generating unit sets a profile of a surface of the virtual liquid to have a curvature that is determined according to a profile of the surface of the organ.

2. The medical image display device according to claim 1, characterized in further comprising a parameter setting unit configured to set feature parameters of the virtual liquid, wherein the virtual liquid generating unit generates the virtual liquid based on the feature parameters set by the parameter setting unit.

3. The medical image display device according to claim 2, wherein the feature parameters set by the parameter setting unit includes at least one of thickness, liquid profile, transparency, reflectance, refraction index and liquid color.

4. The medical image display device according to claim 2, characterized in further comprising a virtual liquid density modifying unit configured to modify a density value of the virtual liquid based on the feature parameters.

5. The medical image display device according to claim 1, characterized in further comprising:
a target organ extracting unit configured to extract a target organ to be a diagnostic target from the medical image; and
a target organ surface data creating unit configured to create surface data of the target organ,
wherein the virtual liquid adding unit adds the virtual liquid to the surface data.

6. The medical image display device according to claim 1, further comprising a parameter setting unit configured to set a thickness of the virtual liquid.

7. The medical image display device according to claim 1, wherein the virtual liquid covers all of a surface of the organ.

8. The medical image display device according to claim 1, wherein the virtual liquid generating unit considers viscosity of the virtual liquid to determine a curvature of the profile of the surface of the virtual liquid.

9. The medical image display device according to claim 1, wherein the virtual liquid generating unit considers surface tension or temperature of mucus of the organ to determine the profile of the surface of the virtual liquid.

10. A medical image display method including:
a medical image reading step that reads a medical image obtained by a medical image diagnostic apparatus;
a projected image creating step that creates a projected image by projecting the medical image on a projection plane;
a projected image display step that displays the projected image;
a virtual liquid generating step that generates virtual liquid which is created by simulating moisture on a surface of an organ,
wherein the virtual liquid generating step sets a profile a surface of the virtual liquid to have a curvature that is determined according to a profile of the surface of the organ; and
a virtual liquid adding step that adds the virtual liquid to the surface of the organ in the medical image,
wherein the virtual liquid is added to the projected image.

11. The medical image display method according to claim 10, further comprising a parameter setting step that sets a thickness of the virtual liquid.

12. The medical image display method according to claim 10, wherein the virtual liquid covers all of a surface of the organ.

* * * * *